(12) United States Patent
Mornacchi et al.

(10) Patent No.: US 12,698,847 B2
(45) Date of Patent: Aug. 4, 2026

(54) JAM DETECTION SYSTEM

(71) Applicant: Microtecnica S.r.l, Turin (IT)

(72) Inventors: Andrea Mornacchi, Turin (IT); Enrico Quaglia, Chieri (IT); Dario Molinelli, Carnate (IT)

(73) Assignee: MICROTECNICA S.R.L., Turin (IT)

( * ) Notice: Subject to any disclaimer, the term of this patent is extended or adjusted under 35 U.S.C. 154(b) by 43 days.

(21) Appl. No.: 18/743,539

(22) Filed: Jun. 14, 2024

(65) Prior Publication Data

US 2024/0418294 A1 Dec. 19, 2024

(30) Foreign Application Priority Data

Jun. 14, 2023 (EP) .................................... 23425032

(51) Int. Cl.

| | |
|---|---|
| ***F16K 11/07*** | (2006.01) |
| ***B64C 27/00*** | (2006.01) |
| ***F15B 13/04*** | (2006.01) |
| ***F16K 37/00*** | (2006.01) |
| *B64C 27/04* | (2006.01) |

(52) U.S. Cl.

CPC ........ *F16K 37/0083* (2013.01); *B64C 27/006* (2013.01); *F16K 11/07* (2013.01); *B64C 27/04* (2013.01)

(58) Field of Classification Search

CPC .......... F15B 13/0402; F15B 2013/0409; F16K 11/0708

See application file for complete search history.

(56) References Cited

U.S. PATENT DOCUMENTS

| | | | |
|---|---|---|---|
| 3,568,705 A | 3/1971 | Boyadjieff et al. | |
| 4,892,114 A | 1/1990 | Maroney et al. | |
| 4,993,781 A | 2/1991 | Lindahl | |
| 9,086,080 B2 | 7/2015 | Schmidt et al. | |
| 11,073,442 B2 | 7/2021 | Glime, III | |
| 2008/0289487 A1 | 11/2008 | Sequera et al. | |
| 2019/0241251 A1* | 8/2019 | Atkins | F01B 25/10 |

OTHER PUBLICATIONS

European Search Report for Application No. 23425032.2, mailed Nov. 20, 2023, 7 pages.

* cited by examiner

*Primary Examiner* — Paul J Gray
(74) *Attorney, Agent, or Firm* — CANTOR COLBURN LLP

(57) ABSTRACT

A jam detection system for use with a spool valve. The jam detection system includes a spool, a safety sleeve which surrounds the spool, a case which surrounds the safety sleeve, a supply-pressure line, and a return-pressure line. The jam detection system comprises a control volume, an input orifice, an outlet line and a pressure detection element. The control volume is configured to be fluidly connected to the supply-pressure line via the input orifice. The control volume is configured to be fluidly connected to the return-pressure line via the outlet line. The pressure detection element is configured to detect the pressure or a change in pressure within the control volume.

13 Claims, 3 Drawing Sheets

JAM DETECTION SYSTEM

CROSS-REFERENCE TO RELATED APPLICATIONS

This application claims the benefit of European Patent Application No. 23425032.2 filed Jun. 14, 2023, the disclosure of which is incorporated herein by reference in its entirety.

TECHNICAL FIELD

This disclosure relates to jam detection systems, and in particular to jam detection systems for use in connection with spool valves which include a safety sleeve.

BACKGROUND

Spool valves are used in many safety-critical situations, for example to control main rotor actuators and tail rotor actuators in helicopters. If the spool become jammed within the spool valve the actuator being controlled by the spool valve may become inoperative and the safety of the apparatus, for example helicopter, in which the spool valve is mounted is jeopardised.

The actuators are typically duplex hydraulic actuators. A duplex hydraulic actuator typically includes a main ram (which includes a piston and a piston rod) which divides a cylinder or chamber into two hydraulic systems. The cylinder is defined by a body and the rod passes through the body through an aperture and a gland fixed to the external surface of the body. The piston is in sealing contact with a wall or walls of the chamber and is configured to move along the chamber whilst remaining in sealing contact with the wall or walls.

The movement of the piston rod is linear and the direction of movement of the piston rod is controlled by the introduction of pressurised hydraulic fluid into one of the hydraulic systems and permitting the expulsion of hydraulic fluid from the other of the hydraulic systems. This allows the piston to move along the hydraulic chamber and thus move the piston rod. The introduction and permitted expulsion of the hydraulic fluid from the hydraulic systems is controlled by linear movement of a spool within a spool valve.

A spool valve with a safety sleeve typically includes a case, a safety sleeve, and a spool. The case at least partially defines a case void. The safety sleeve is configured to be in sliding contact with an inner face of the case which at least partially defines the case void. The safety sleeve may move longitudinally along the case void. The safety sleeve is typically in a rest position within the case void when the spool is not jammed within the safety sleeve.

The spool is configured to be in sliding contact with the inner face of the safety sleeve defining the sleeve void. The spool may move longitudinally along the sleeve void.

The case includes at least one input port and at least one outlet port that extend from the outer face of the case to the inner face of the case. The safety sleeve is so configured that it defines two or more fluid conduits that are so positioned and configured that when the safety sleeve in in the rest position a separate fluid conduit extends between each of the input or outlet ports of the case and an input or outlet mouth in the inner surface of the safety sleeve that defines the safety sleeve void.

The safety sleeve is also so configured that, dependent on the longitudinal position of the safety sleeve in the case void when the safety sleeve is not in the rest position, the inner face of the case and the face of the safety sleeve in contact with the inner face of the case define one or more fluid conduits between one or more of the input ports and one or more of the outlet ports. At different longitudinal positions of the safety sleeve the conduits, if they fluidly connect an input port and an outlet port, connect different input and output ports than at different longitudinal positions.

The spool is so configured that, dependent on the longitudinal position of the spool in the sleeve void the spool may block one or more of the input and outlet mouths and/or define, in conjunction with a portion of the inner face of the safety sleeve, one or more fluid conduits between one or more of the input mouths and one or more of the outlet mouths.

Each case input and outlet port is configured to be connected to a hydraulic actuator or a hydraulic system via a supply-pressure line or a return-pressure line as appropriate. The or each hydraulic system typically includes a reservoir of hydraulic fluid and a means for providing pressurised hydraulic fluid.

In use, if the spool of a spool valve with a safety sleeve becomes jammed within the safety sleeve, attempted movement of the spool will cause the safety sleeve to move longitudinally within the case void and the spool valve will continue to control the operation of the one or more actuators with which the spool valve is associated.

SUMMARY

According to a first aspect of the present disclosure, there is provided a jam detection system for use with a spool valve that comprises a spool, a safety sleeve which surrounds the spool, a case which surrounds the safety sleeve, a supply-pressure line, and a return-pressure line, in which the jam detection system comprises a control volume, an input orifice, an outlet line and a pressure detection element; the control volume is configured to be fluidly connected to the supply-pressure line via the input orifice; the control volume is configured to be fluidly connected to the return-pressure line via the outlet line; and the pressure detection element is configured to detect the pressure or a change in pressure within the control volume.

In an embodiment of the above embodiment, the output line comprises an outlet orifice. The outlet orifice may be at one end of the output line or between the ends of the output line.

In an embodiment of any of the above embodiments, the cross-section of the outlet orifice (in a plane approximately perpendicular to direction of flow of fluid travelling along the outlet line) is smaller than the cross-section of the outlet line (in the same plane).

In an embodiment of any of the above embodiments, the input orifice is in fluid communication with the control volume via a pressure line.

In an embodiment of any of the above embodiments, the input orifice is in direct fluid communication with the control volume. That is the orifice is in an element that defines the control volume.

In an embodiment of any of the above embodiments, the pressure detection element is configured to detect or measure the absolute or gauge pressure within the control volume.

Reference to pressure herein may be reference to absolute or gauge pressure.

In an embodiment of the above embodiment, the pressure detection element is configured to detect or measure changes in the absolute or gauge pressure within the control volume. For example the change from a first pressure to a second lower pressure.

In an embodiment of any of the above embodiments, the supply-pressure line and the return-pressure line both contain hydraulic fluid.

In an embodiment of any of the above embodiments, the return pressure line contains a fluid that is typically pressurised to a lower pressure than the fluid in the supply-pressure line.

In an embodiment of any of the above embodiments, the pressure detection element includes one or more of a pressure switch, a pressure sensor, and a mechanical switch and a membrane, or other suitable pressure measurement or detection means.

In an embodiment of any of the above embodiments, the pressure detection element is configured to continuously measure the fluid pressure within the control volume.

In an embodiment of any of the above embodiments, the jam detection system includes a control unit, and the control unit is in communication with the pressure detection element.

In an embodiment of any of the above embodiments, the pressure detection element generates a signal if the pressure detection element detects a change of pressure within the control volume, and the signal is communicated to the control unit.

In an embodiment of any of the above embodiments, the pressure detection element generates a signal if the pressure detection element detects a change of pressure within the control volume greater than a predetermined pressure change.

In an embodiment of any of the above embodiments, the pressure detection element generates a signal if the pressure detection element detects a change of pressure within the control volume that occurs within a predetermined period of time and which is greater than a predetermined pressure change.

In an embodiment of any of the above embodiments, the pressure detection element generates a signal if the pressure detection element detects a change of pressure within the control volume that lasts for a predetermined period of time and which is greater than a predetermined pressure change.

In an embodiment of any of the above embodiments, the control unit is configured to generate one or more alerts if the pressure detection element detects a change in the fluid pressure within the control volume.

In an embodiment of any of the above embodiments, the control unit is configured to generate one or more alerts if the pressure detection element detects the achievement of a predetermined absolute or gauge pressure within the control volume.

According to a second aspect of the present disclosure there is provided a spool valve comprising a spool, a safety sleeve which surrounds the spool, a case which surrounds the safety sleeve, a supply-pressure line, a return-pressure line, and a jam detection system according to any of the embodiments of the first aspect of the present disclosure, in which the spool and case are so configured that the safety sleeve occupies a rest position when the spool is not jammed within the safety sleeve, and the safety sleeve is configured to move from the rest position when the spool is jammed within the safety sleeve and the spool is caused to move.

In an embodiment of the above embodiment, the case defines a case void. The safety sleeve is configured to be in sliding contact with the inner face of the case defining the case void, and may move longitudinally along the case void. The safety sleeve occupies a rest position within the case void when the spool is not jammed.

In an embodiment of any of the above embodiments, the spool valve includes a biasing means, and the biasing means is configured to bias the safety sleeve into the rest position.

In an embodiment of any of the above embodiments, the safety sleeve defines a sleeve void and the spool is configured to be in sliding contact with the inner face of the safety sleeve defining the sleeve void. The spool is configured to be able to move longitudinally within the sleeve void. The longitudinal movement may, depended on the spool's longitudinal position within the sleeve void, be in either direction along the sleeve void.

In an embodiment of any of the above embodiments, the case includes at least one input port and at least one outlet port. Each input port is configured to be connectable to a supply-pressure line, and each outlet port is configured to be connectable to a return-pressure line.

In an embodiment of any of the above embodiments, the case input and outlet ports are fluidly connected to a hydraulic supply system via a supply-pressure line or a return-pressure line. The hydraulic supply system typically includes a reservoir of hydraulic fluid and a means for providing pressurised hydraulic fluid.

In an embodiment of any of the above embodiments, the safety sleeve is so configured that it defines two or more fluid conduits that, when the safety sleeve is in the rest position, extend between the end of the input or outlet ports opening in the inner face of the case and input or outlet mouths in the inner surface of the safety sleeve.

In an embodiment of any of the above embodiments, the safety sleeve is also so configured that, dependent on the longitudinal position of the safety sleeve in the case void when the safety sleeve is not in the rest position, the safety sleeve may block the mouths of one or more of the input and outlet ports in the inner face of the case and/or define, in conjunction with a portion of the inner face of the case, one or more fluid conduits that extend between one or more of the input ports and one or more of the outlet ports.

In an embodiment of any of the above embodiments, the spool is so configured that, dependent on the longitudinal position of the spool in the sleeve void, the spool blocks one or more of the input and outlet mouths on the inner face of the safety sleeve and/or defines, in conjunction with a portion of the inner face of the safety sleeve, one or more fluid conduits that extend between one or more of the input mouths and one or more of the outlet mouths.

In an embodiment of any of the above embodiments, when the spool valve is in use, if the spool becomes jammed within the safety sleeve, attempted movement of the spool will cause the safety sleeve to move longitudinally within the case void and the spool valve will continue to function. Where the spool valve is being used to control the operation of one or more actuators, the spool valve will continue to control those actuators.

In an embodiment of any of the above embodiments, the safety sleeve at least partially blocks the fluid connection between the control volume and the return-pressure line when the safety sleeve is in the rest position.

In an embodiment of any of the above embodiments, the blocking of the fluid connection between the control volume and the return-pressure line when the safety sleeve is in the rest position is only partial because of leakage at the intersection of the fluid connection and the safety sleeve.

In an embodiment of any of the above embodiments, the blocking of the fluid connection between the control volume and the return-pressure line when the safety sleeve is in the rest position is complete when there is no leakage at the intersection of the fluid connection and the safety sleeve.

In an embodiment of any of the above embodiments, the input orifice is configured to permit a first rate of fluid flow from the supply-pressure line into the control volume, fluid flows along the outlet line at a second rate of fluid flow when the safety sleeve is in the rest position, and the first rate of fluid flow is greater than the second rate of fluid flow. In some embodiments the second rate of fluid flow is zero. In some embodiments the second rate of fluid flow is caused by leakage at the intersection of the fluid connection from the control volume and the safety sleeve. The difference between the first and second rates of fluid flow has the effect that the pressure of the fluid within the control volume is or remains the same as the pressure of the fluid in the supply-pressure line when the safety sleeve is in the rest position.

In an embodiment of any of the above embodiments, the input orifice is configured to permit a first rate of fluid flow from the supply-pressure line into the control volume, fluid flows along the outlet line at a third rate of fluid flow when the safety sleeve is not in the rest position, and the first rate of fluid flow is less than the third rate of fluid flow. This has the result that when the safety sleeve moves out of the rest position the rate of flow of fluid out of the control volume is greater than the rate of flow of that fluid into the control volume and, as a result, the fluid pressure in the control volume will decrease.

In an embodiment of any of the above embodiments, one or both of the input orifice is in fluid communication with the control volume via a pressure line.

According to a third aspect of the present disclosure there is provided a helicopter rotor actuator control system comprising at least one spool valve according to the second aspect of the present disclosure.

In an embodiment of the above embodiment, the control system includes two spool valves according to the second aspect of the present disclosure.

In an embodiment of any of the above embodiments, a common movement input actuates the spool of each spool valve.

In an embodiment of any of the above embodiments, the common movement input is a user operable control lever. The user may, for example, be a pilot.

The systems or spool valves of the first, second, and third aspects of the present disclosure can include one or more, or all, of the features described above, as appropriate.

BRIEF DESCRIPTION OF THE FIGURES

The present disclosure will be further described and explained by way of example with reference to the accompanying drawings in which.

DETAILED DESCRIPTION

The following description is directed at jam detection systems of the present disclosure in use in a helicopter. It will be understood that the jam detection systems of the present disclosure may be used in other systems. The benefits resulting from the use of the jam detection systems of the present disclosure will be present in those other systems.

Figure 1:
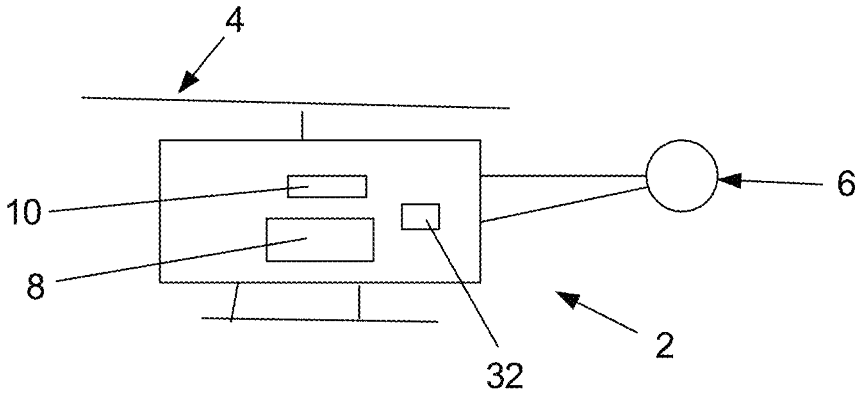
FIG. 1 shows a schematic view of a helicopter which includes an embodiment of a jam detection system according to the present disclosure.

With reference to FIG. 1, a helicopter 2 includes a main rotor 4 and a tail rotor 6. The main and tail rotors 4, 6 are powered by an engine 8. At least part of the functioning of the main and tail rotors 4, 6 is controlled by a dual hydraulic actuator system 10. Hydraulic power for the dual hydraulic actuator system 10 is supplied by a hydraulic supply system 32.

With reference to FIGS. 2 to 6, the dual hydraulic actuator system 10 includes a first and second system of hydraulics 12, 14, and a first and second two-way actuator 16, 18.

Figure 3:
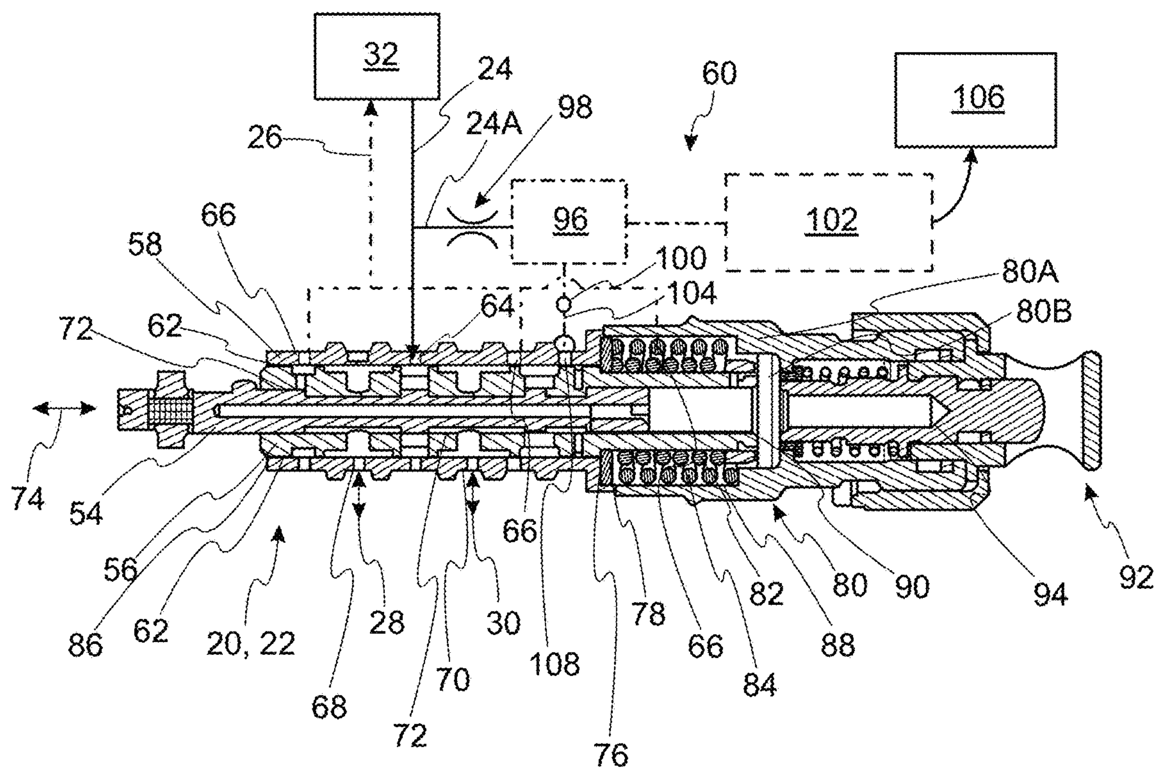
FIG. 3 shows a schematic view of an embodiment of a spool valve for use in the dual hydraulic actuator of FIG. 2.

Each of the first and second systems of hydraulics 12, 14 includes a main control valve (MCV) in the form of a spool valve 20, 22 (shown in FIG. 3).

Each two-way actuator 16, 18 includes a longitudinally extending hydraulic cylinder 36 which is divided into two hydraulic systems 36A, 36B by a piston 38 on a longitudinally extending piston shaft 34.

The dual hydraulic actuator system 10 has a first end in the form of an earthed spherical bearing 46, and a second end in the form of a moving spherical bearing 48. The earthed spherical bearing 46 is fixed to the outside and free end of the first actuator 16. The earthed spherical bearing 46 is connected to an element of the helicopter 2 that is in a fixed position within the helicopter 2.

The moving spherical bearing 48 is fixed to the free end of the piston shaft 34 of the second two-way actuator 18. The moving spherical bearing 48 can move relative to the earthed spherical bearing 46 with the movement of the piston shaft 34 to which it is fixed. The moving spherical bearing 48 is mechanically linked to one or both of the main and tail rotors 4, 6.

Figure 2:
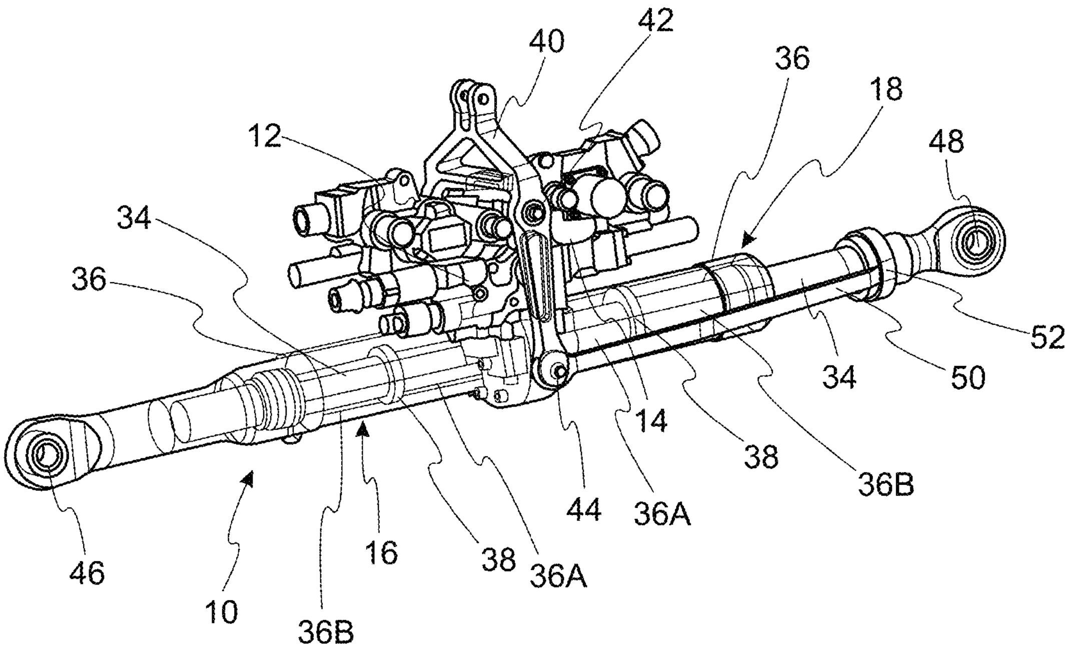
FIG. 2 shows a schematic view of an embodiment of a dual hydraulic actuator which includes an embodiment of a hydraulic valve jam detection system according to the present disclosure.

The first system of hydraulics 12 includes a first spool valve 20 which controls and directs the actuation of the first two-way actuator 16 via hydraulic lines 28, 30 (not shown in FIG. 2). The first spool valve 20 receives pressurised hydraulic fluid from the hydraulic supply system 32 via a supply-pressure line 24 and directs pressurised hydraulic fluid into one of the hydraulic systems 36A, 36B via one of hydraulic lines 28, 30 to cause actuation of the piston 34 within the hydraulic cylinder 36. Hydraulic fluid is exhausted from the other of the hydraulic systems 36A, 36B via the other of the hydraulic lines 28, 30 back to the first spool valve 20 and then back to the hydraulic supply 32 system via a return-pressure line 26.

In a similar fashion, the second system of hydraulics 14 includes a second spool valve 22 which controls and directs the actuation of the second two-way actuator 18 via hydraulic lines 28, 30 (not shown in FIG. 2). The second spool valve 22 receives pressurised hydraulic fluid from the hydraulic supply 32 system via a supply-pressure line 24 and directs pressurised hydraulic fluid into one of the hydraulic systems 36A, 36B of the second two-way actuator 18 via one of hydraulic lines 28, 30 to cause actuation of the piston 34 within the actuator chamber 36. Hydraulic fluid is exhausted from the other of the hydraulic systems 36A, 36B via the other of the hydraulic lines 28, 30 back to the second spool valve 22 and then back to the hydraulic supply system 32 via a return-pressure line 26.

The first and second spool valves 20, 22 are both actuated by a control lever 40 controlled by a user such as a pilot (not shown). The control lever 40 is pivotally connected to the dual hydraulic actuator system 10 by pivots 42 (only one is shown in FIG. 2) and the first and second spool valves 20, 22 are linked to the control lever 40 at a connection point (not shown) by one or more link elements (not shown). This has the effect that movement of the control lever 40 actuates the spool valves 20, 22.

The user is provide with mechanical feedback on movement of the moving spherical bearing 48 by way of a feedback linkage 50 which extends between a collar 52 fixed to the piston shaft/rod 34 of the second two-way actuator 18 adjacent the moving spherical bearing 48, and a feedback connection joint 44 on the control lever 40.

Each of the first and second spool valves 20, 22 includes a spool 54, a safety sleeve 56, a case 58, and a jam detection system 60.

The case 58 is essentially tubular and has an inner face 62 which defines a case void (not labelled). Extending through the case 58 from its outer face 110 to the inner face 62 is an input port 64 to which the supply-pressure line 24 is connected. Extending through the case 58 from its outer face 110 to the inner face 62 are a non-zero number of outlet ports 66 which are all connected return-pressure line 26. Also extending through the case 58 from its outer face 110 to the inner face 62 are hydraulic ports 68, 70 which are connected to hydraulic lines 28, 30 respectively.

The case 58 has a free end 86 and the other end of the case 58 is engaged with a housing 80. The housing 80 includes a housing sleeve 80A and an end element 80B. The end element 80B is in sliding engagement with the housing sleeve 80A and may move in the directions shown by arrow 74 in FIG. 3. The housing sleeve 80A includes an inner housing face 88 and the end element 80B includes an end face 90. Housing face 88 and end face 90 together define a housing void (not labelled).

The safety sleeve 56 is partially located within the case void and extends into the housing void. The safety sleeve 56 has an outer face 116 which is in close sliding contact with at least a portion of the inner face 62 of the case 58. The safety sleeve 56 also has an inner face 72 which defines a safety sleeve void (not labelled).

The spool 54 is located within the safety spool void. The spool 54 has an outer surface 130 which is in close sliding contact with at least a portion the inner surface 72 of the safety sleeve 56.

The safety sleeve 56 is shown in FIG. 3 in the rest position. The rest position is one in which a stop step 76 extending circumferentially around the outer surface of the safety sleeve 56 abuts a stop element 78. The safety sleeve 56 is biased against the stop element 78 by a sleeve biasing means 82 located within the housing void. The stop element 78 is retained in position by an element biasing means 84 located within the housing void. The spring force of the element biasing means 84 is greater than that of the sleeve biasing means 82.

The spring force of both the sleeve biasing means 82 and element biasing means 84 may be overcome by forces exerted on the spool valves 20, 22 by the control lever 40 when one or both of the spool 54 is jammed within the safety sleeve 56 of the spool valve 20, and the spool 54 is jammed within the safety sleeve 56 of the spool valve 22.

The case 58, safety sleeve 56, and spool 54 in each of the spool valves 20, 22 are collectively so configured that:

(i) When the spool 54 is not jammed in the safety sleeve 56 in one or both of the spool valves 20, 22 the spool 54 of the non-jammed spool valves may move along the safety sleeve void in the direction indicated by arrow 74 and, dependent on the position of the spool 54 relative to the safety sleeve 56:

(a) prevent the flow of hydraulic fluid from the case inlet port 64 to either of the hydraulic ports 68, 70; and (b) permit both the flow of hydraulic fluid from the case inlet port 64, through the safety sleeve 56, between the spool 54 and the inner surface 72 of the safety sleeve 56, through the safety sleeve 56 and to the hydraulic port 68, and the flow of hydraulic fluid from the hydraulic port 70 through the safety sleeve 56, between the spool 54 and the inner surface 72 of the safety sleeve 56, through the safety sleeve 56 and to one or more of the case outlet ports 66; or (c) permit both the flow of hydraulic fluid from the case inlet port 64, through the safety sleeve 56, between the spool 54 and the inner surface 72 of the safety sleeve 56, through the safety sleeve 56 and to the hydraulic port 70, and the flow of hydraulic fluid from the hydraulic port 68 through the safety sleeve 56, between the spool 54 and the inner surface 72 of the safety sleeve 56, through the safety sleeve 56 and to one or more of the case outlet ports 66.

(ii) When the spool 54 is jammed in the safety sleeve 56 in one or both of the spool valves 20, 22 the safety sleeve 56 in each jammed spool may move along the case void in the direction indicated by arrow 74 and, dependent on the position of the safety sleeve 56 relative to the case 58:

(a) prevent the flow of hydraulic fluid from the case inlet port 64 to either of the hydraulic ports 68, 70;

(b) permit both the flow of hydraulic fluid from the case inlet port 64, between the safety sleeve 56 and the inner surface 62 of the case 58, and to the hydraulic port 68, and the flow of hydraulic fluid from the hydraulic port 70, between the safety sleeve 56 and the inner surface 62 of the case 58, and to one or more of the case outlet ports 66; or (c) permit both the flow of hydraulic fluid from the case inlet port 64, between the safety sleeve 56 and the inner surface 62 of the case 58, and to the hydraulic port 70, and the flow of hydraulic fluid from the hydraulic port 68, between the safety sleeve 56 and the inner surface 62 of the case 58, and to one or more of the case outlet ports 66.

The above described configuration of the first and second spool valves 20, 22 is beneficial because jamming of one or both of the spool 54 within the safety sleeve 56 of the spool valve 20, and the spool 54 within the safety sleeve 56 of the spool valve 22 does not lead to loss of use of both the first and second two-way actuators 16, 18. A pilot would not, however, be aware of the jamming.

Because the pilot would not be aware of the jamming, when using known dual hydraulic actuator systems 10, which do not include a jam detection system 60 according to the present disclosure, it is necessary to regularly inspect the first and second spool valves for jamming. This is recommended to occur approximately every 100 flight hours of the helicopter in which the dual hydraulic actuator system 10 is fitted.

A typical inspection procedure would be:

Lock the control lever 40 and then inhibit the movement of the spool 54 in the direction of the arrow 74;

Attach a jam test device 92 and push said jam device 92 until test element 94 is in contact with the safety sleeve 56 via the end element 80B (as shown in FIG. 3).

The force applied to the test device 92 is increased to overcome the spring force of the sleeve biasing means 82.

When the spool 54 is not jammed in the safety sleeve 56, the safety sleeve 56 moves freely over the spool 54. If the spool 54 is jammed within the safety sleeve 56, the safety sleeve 54 will not move because of the jam.

The above described inspection procedure is time consuming and only provides information concerning the jamming or otherwise of the spool 54 within the safety valve at the time that the inspection procedure is performed.

The jam detection system 60 includes a control volume 96, an input orifice 98, an outlet line 100 and a pressure detection element 102.

The control volume 96 is fluidly connected to the supply-pressure line 24 via a supply-pressure line spur 24A. The input orifice 98 is located between the ends of the supply-pressure line spur 24A.

In other non-illustrated embodiments the input orifice 98 is located at or adjacent the intersection of the supply-pressure line spur 24A and the supply-pressure line 24.

In other non-illustrated embodiments the input orifice 98 is located at or adjacent the intersection of the supply-pressure line spur 24A and the control volume 96.

The input orifice 98 has a cross-section (in a plane approximately perpendicular to the direction of flow of fluid along the supply-pressure line spur 24A) that is smaller than the cross section of the supply-pressure line spur 24A.

The control volume 96 is fluidly connected to the return-pressure line 26 via the outlet line 104 and the spool valve 20 or 22.

The outlet line 104 is in fluid communication with a passage 108 extending through the case 58 between the outer face 110 of the case 58 and the inner face 62.

The outlet line 104 includes an outlet orifice 100. The outlet orifice 100 has a cross-section (in a plane approximately perpendicular to the direction of flow of fluid along the outlet line 104) that is smaller than the cross section (in a parallel plane) of the outlet line 104 adjacent the outlet orifice.

In other non-illustrated embodiments the outlet orifice 100 is at or adjacent one end of the outlet line 104, or not present at all.

The pressure detection element 102 is configured to detect the pressure or a change in pressure within the control volume 96. The pressure detection element 102 may be or include a pressure switch, a pressure sensor, a mechanical switch and a membrane or other suitable pressure measurement or detection means.

The jam detection system 60 also includes a control unit 106 which is in communication with the pressure detection element 102. The control unit 106 is in communication with, or part of, one or more control systems (not shown) and/or user interfaces (not shown) in the helicopter 2. At least one of the user interfaces may be a warning light, audible alarm, or other means of communicating information to a user such as a pilot.

The pressure detection element 102 is configured to generate a signal if the pressure detection element 102 detects a change of pressure within the control volume 96. The signal is communicated to the control unit 106.

In an alternative embodiment, the pressure detection element 102 generates a signal if the pressure detection element 102 detects a change of pressure within the control volume 96. The pressure detection element may be configured to detect a change of pressure which is greater than a predetermined pressure change.

The safety sleeve 54 is so configured that it at least partially blocks the fluid connection between the control volume 96 and the return-pressure line 26 when the safety sleeve 54 is in the rest position. The blocking of the fluid connection is achieved by the safety sleeve 54 being so configured that the end of the passage 108 is blocked or closed by the safety sleeve 54.

The passage 108 is fully blocked if the safety sleeve 54 is so configured that there is no leakage from the passage 108 into the case void. The passage 108 is partially blocked if the safety sleeve 54 is so configured that there is leakage from the passage 108 into the case void.

Figure 4:
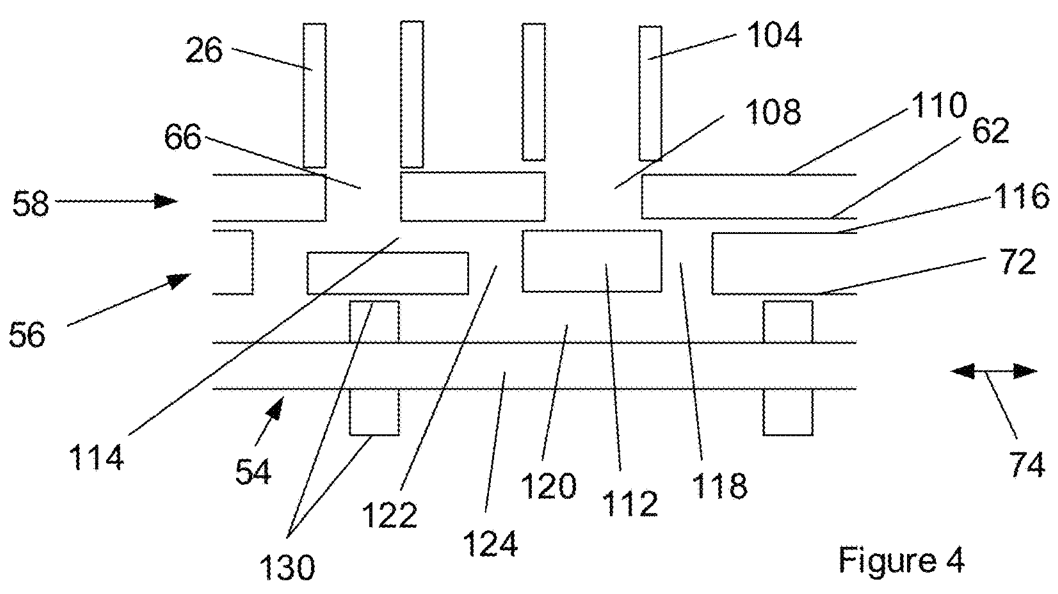
FIG. 4 shows a first schematic detail of the dual hydraulic actuator of FIG. 2.
Figure 5:
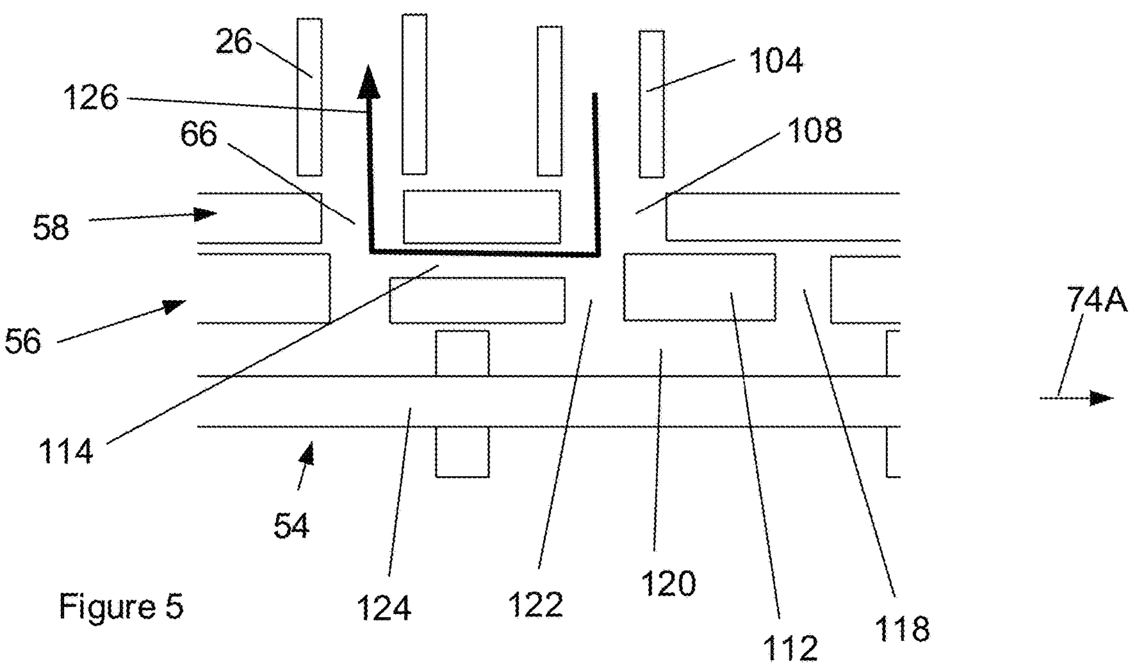
FIG. 5 shows a second schematic detail of the dual hydraulic actuator of FIG. 2.
Figure 6:
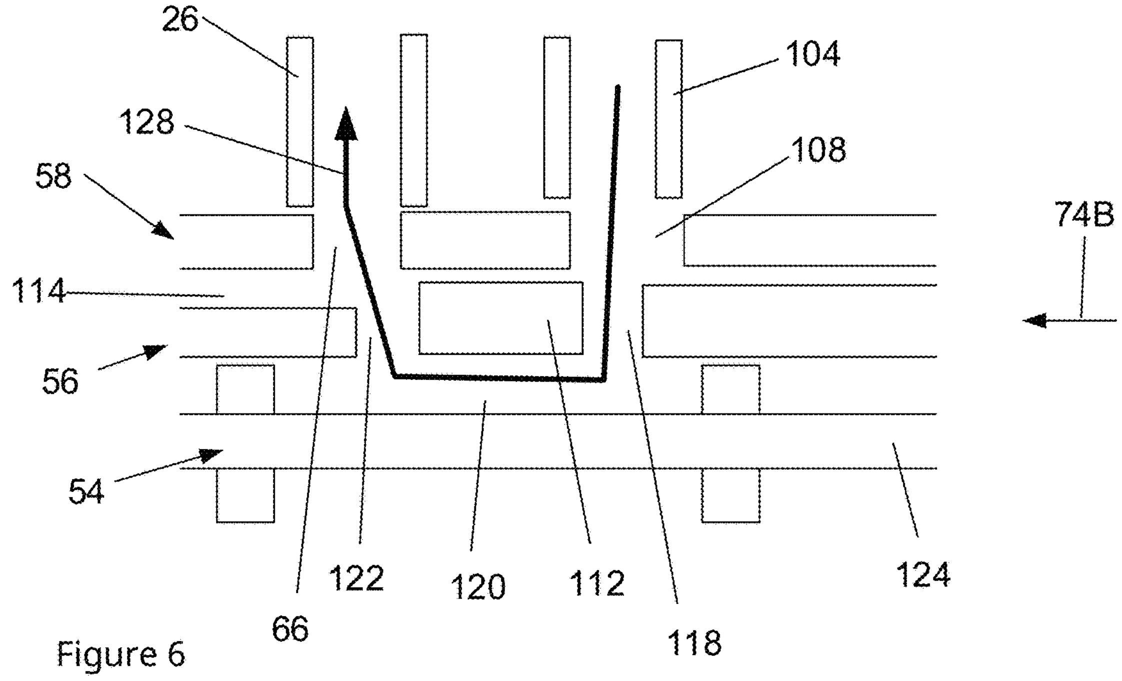
FIG. 6 shows a third schematic detail of the dual hydraulic actuator of FIG. 2.

With reference to FIGS. 4 to 6, the functioning of the interaction of the outlet line 104 and the spool rest of the spool valve 20, 22 is further explained.

FIG. 4 shows the arrangement of the outlet line 104 and the rest of the spool valve 20, 22 when the safety sleeve 56 is in the rest position and the spool 54 is not jammed in the safety sleeve 56. As may be seen, the outlet line 104 is in fluid communication with the passage 108 at the mouth of the passage 108 in the outer face 110 of the case 58. The mouth of the passage 108 in the inner face 62 of the case 58 is blocked by the safety sleeve land 112 of the safety sleeve 56. The blocking is partial if the hydraulic fluid can leak from the passage 108 and into the case void defined by the inner face 62 of the case 58.

The blocking of the mouth of the passage 108 in the inner face 62 of the case 58 by the safety sleeve land 112 has the result that the flow of fluid from passage 108 to the outlet port 66 via safety sleeve conduit 114, or via passage 118 extending between the outer face 116 and the inner face 72 of the safety sleeve 56, the spool conduit 120 formed between the inner face 72 of the safety sleeve 56 and the spool shaft 124, passage 122 extending between the outer face 116 and the inner face 72 of the safety sleeve 56, and safety sleeve conduit 114.

The spool 54 can move in the directions indicated by arrow 74 within the safety sleeve void partially defined by the inner face 72 of the safety sleeve 56.

FIG. 5 shows the arrangement of the outlet line 104 and the rest of the spool valve 20, 22 when the spool 54 is jammed in the safety sleeve 56 and the safety sleeve 56 has moved out of the rest position in the direction shown by arrow 74A. As may be seen, the safety sleeve land 112 has, as a result of the movement of safety sleeve 56, ceased to block the mouth of the passage 108 in the inner face 62 of the case 58. Fluid may thus flow from passage 108 to the outlet port 66 and then return-pressure line 26 via safety sleeve conduit 114. The flow of the fluid is illustrated by arrow 126.

FIG. 6 shows the arrangement of the outlet line 104 and the rest of the spool valve 20, 22 when the spool 54 is jammed in the safety sleeve 56 and the safety sleeve 56 has moved out of the rest position in the direction shown by arrow 74B. As may be seen, the safety sleeve land 112 has, as a result of the movement of safety sleeve 56, ceased to block the mouth of the passage 108 in the inner face 62 of the case 58. Fluid may thus flow from passage 108 to the outlet port 66 and then return-pressure line 26 via passage 118, the spool conduit 120, passage 122, and safety sleeve conduit 114. The flow of the fluid is illustrated by arrow 128.

The input orifice 98 is configured to permit a first rate of fluid flow from the supply-pressure line 24 along the supply-pressure line spur 24A into the control volume 96.

The outlet line 104 allows a second rate of fluid flow when the safety sleeve is in the rest position, and the first rate of fluid flow is greater than the second rate of fluid flow.

The outlet orifice 100 may be used to calibrate flow rates of fluid through the outlet line 104.

The outlet line 104 allows a third rate of fluid flow out of the control volume 96 when the safety sleeve 54 is not in the rest position, and the first rate of fluid flow is less than the third rate of fluid flow.

The above description is meant to be exemplary only, and one skilled in the art will recognize that changes may be made to the embodiments described without departing from the scope of the disclosure. Still other modifications which fall within the scope of the present disclosure will be apparent to those skilled in the art, in light of a review of this disclosure.

Various aspects of the method and apparatus disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A helicopter rotor actuator control system comprising:

a spool valve and a jam detection system, the spool valve comprising:

a spool;

a safety sleeve which surrounds the spool;

a case which surrounds the safety sleeve, a supply-pressure line, and a return-pressure line; and the jam detection system comprising:

a control volume, an input orifice, an outlet line and a pressure detection element;

wherein the control volume is configured to be fluidly connected to the supply-pressure line via the input orifice;

wherein the control volume is configured to be fluidly connected to the return-pressure line via the outlet line; and wherein the pressure detection element is configured to detect the pressure or a change in pressure within the control volume' wherein:

the spool and case are so configured that the spool occupies a rest position when the spool is not jammed within the safety sleeve, and the spool is configured to move from the rest position when the spool is jammed within the safety sleeve.

2. The helicopter rotor actuator control system according to claim 1, wherein the output line comprises an outlet orifice.

3. The helicopter rotor actuator control system according to claim 2, wherein the pressure detection element comprises one or more of a pressure switch, a pressure sensor, and a mechanical switch and a membrane.

4. The helicopter rotor actuator control system according to claim 3, wherein the system comprises a control unit, and the control unit is in communication with the pressure detection element.

5. The helicopter rotor actuator control system according to claim 4, wherein the pressure detection element generates a signal if the pressure detection element detects a change of pressure within the control volume, and the signal is communicated to the control unit.

6. The helicopter rotor actuator control system according to claim 5, wherein the pressure detection element generates a signal if the pressure detection element detects a change of pressure within the control volume greater than a predetermined pressure change.

7. The helicopter rotor actuator control system according to claim 1, wherein the safety sleeve at least partially prevents flow of fluid along the outlet line when the safety sleeve is in the rest position.

8. The helicopter rotor actuator control system according to claim 7, wherein:

the input orifice is configured to permit a first rate of fluid flow from the supply-pressure line into the control volume;

fluid flows along the outlet line at a second rate of fluid flow when the safety sleeve is in the rest position; and the first rate of fluid flow is greater than the second rate of fluid flow.

9. The helicopter rotor actuator control system according to claim 8, wherein:

the input orifice is configured to permit a first rate of fluid flow from the supply-pressure line into the control volume;

fluid flows along the outlet line at a third rate of fluid flow when the safety sleeve is not in the rest position; and the first rate of fluid flow is less than the third rate of fluid flow.

10. The helicopter rotor actuator control system according to claim 1, wherein the input orifice is in fluid communication with the control volume via a pressure line.

11. The helicopter rotor actuator control system according to claim 1, comprising another spool valve.

12. The helicopter rotor actuator control system according to claim 11, wherein a common input actuates the spool of each spool valve.

13. The helicopter rotor actuator control system according to claim 12, wherein the input is a user operable control lever.

* * * * *